US012280575B2

(12) United States Patent
Fujimoto et al.

(10) Patent No.: US 12,280,575 B2
(45) Date of Patent: Apr. 22, 2025

(54) FILM FOR COATING METAL SHEET AND RESIN COATED METAL SHEET

(71) Applicant: JFE Steel Corporation, Tokyo (JP)

(72) Inventors: Soichi Fujimoto, Tokyo (JP); Yasuhide Oshima, Tokyo (JP); Katsumi Kojima, Tokyo (JP)

(73) Assignee: JFE Steel Corporation, Tokyo (JP)

( * ) Notice: Subject to any disclaimer, the term of this patent is extended or adjusted under 35 U.S.C. 154(b) by 24 days.

(21) Appl. No.: 17/286,596

(22) PCT Filed: Oct. 21, 2019

(86) PCT No.: PCT/JP2019/041355
§ 371 (c)(1),
(2) Date: Apr. 19, 2021

(87) PCT Pub. No.: WO2020/090552
PCT Pub. Date: May 7, 2020

(65) Prior Publication Data
US 2021/0370655 A1 Dec. 2, 2021

(30) Foreign Application Priority Data
Oct. 31, 2018 (JP) ................. 2018-204808

(51) Int. Cl.
| | | |
|---|---|---|
| *B32B 27/36* | (2006.01) | |
| *B29C 48/00* | (2019.01) | |
| *B29C 48/08* | (2019.01) | |
| *B29C 48/21* | (2019.01) | |
| *B29C 48/88* | (2019.01) | |
| *B29C 55/00* | (2006.01) | |
| *B29C 55/04* | (2006.01) | |
| *B29K 67/00* | (2006.01) | |
| *B29L 7/00* | (2006.01) | |
| *B32B 15/04* | (2006.01) | |
| *B32B 15/09* | (2006.01) | |
| *B65D 25/14* | (2006.01) | |
| *B65D 25/34* | (2006.01) | |
| *B65D 65/40* | (2006.01) | |
| *C08J 5/18* | (2006.01) | |

(52) U.S. Cl.
CPC .......... *B32B 27/36* (2013.01); *B29C 48/0018* (2019.02); *B29C 48/022* (2019.02); *B29C 48/08* (2019.02); *B29C 48/21* (2019.02); *B29C 48/914* (2019.02); *B29C 55/005* (2013.01); *B29C 55/04* (2013.01); *B32B 15/04* (2013.01); *B32B 15/09* (2013.01); *B65D 25/14* (2013.01); *B65D 25/34* (2013.01); *B65D 65/40* (2013.01); *C08J 5/18* (2013.01); *B29K 2067/006* (2013.01); *B29L 2007/008* (2013.01); *B32B 2270/00* (2013.01); *B32B 2307/54* (2013.01); *B32B 2439/66* (2013.01); *C08J 2367/02* (2013.01)

(58) Field of Classification Search
CPC ........ B32B 2307/732; B32B 2307/736; B32B 15/04; B32B 15/09; B65D 25/14; B65D 65/40
See application file for complete search history.

(56) References Cited

U.S. PATENT DOCUMENTS

| | | | |
|---|---|---|---|
| 6,610,378 B1 | 8/2003 | Kimura et al. | |
| 2003/0108775 A1 | 6/2003 | Kobayashi et al. | |
| 2004/0265539 A1* | 12/2004 | Hashimoto | ............ C08J 7/046 428/141 |
| 2005/0048324 A1* | 3/2005 | Ejiri | .................... G11B 5/7085 428/128 |
| 2007/0172682 A1* | 7/2007 | Kobayashi | ................ C08J 5/18 428/847.2 |
| 2010/0120967 A1* | 5/2010 | Kinoshita | ............ C08G 63/672 528/298 |
| 2013/0172615 A1 | 7/2013 | Horie et al. | |

FOREIGN PATENT DOCUMENTS

| | | | | |
|---|---|---|---|---|
| CN | 103118853 A | | 5/2013 | |
| EP | 1398344 A1 | | 3/2004 | |
| EP | 1734067 A1 | | 12/2006 | |
| JP | 068335 A | | 1/1994 | |
| JP | 07186353 A | | 7/1995 | |
| JP | 07214724 A | | 8/1995 | |
| JP | 07290666 A | | 11/1995 | |
| JP | 09155969 A | | 6/1997 | |
| JP | 2000103878 A | | 4/2000 | |
| JP | 2000158583 A | | 6/2000 | |
| JP | 2001205736 A | | 7/2001 | |
| JP | 2006001033 A | * | 1/2006 | |
| JP | 2011126056 A | | 6/2011 | |
| JP | 2017132990 A | | 8/2017 | |
| KR | 20070004448 A | * | 1/2007 | ............... C08J 5/18 |
| WO | 2008117842 A1 | | 10/2008 | |
| WO | WO-2016084568 A1 | * | 6/2016 | ............ B32B 27/36 |

OTHER PUBLICATIONS

XP002804072, Database WPI, Week 201755, Thomson Scientific, London, GB, AN 2017-52575X, dated Jan. 22, 2016, 2 pages.
Extended European Search Report for European Application No. 19 879 806.8, dated Sep. 22, 2021, 9 pages.
Australian Examination Report for Australian Application No. 2019369562, dated Dec. 1, 2021, 4 pages.
International Search Report and Written Opinion for International Application No. PCT/JP2019/041355, dated Dec. 24, 2019, 6 pages.
Chinese Office Action with Search Report for Chinese Application No. 201980071195.X, dated Dec. 9, 2022, 10 pages.

* cited by examiner

*Primary Examiner* — Alicia J Weydemeyer
(74) *Attorney, Agent, or Firm* — Buchanan Ingersoll & Rooney PC

(57) ABSTRACT

A film for coating a metal sheet, the film satisfying that: a ratio ($E_{MD}/E_{TD}$) of a Young's modulus $E_{MD}$ in a lengthwise direction to a Young's modulus $E_{TD}$ in a width direction is 1.1 to 4.0; and a thermal shrinkage rate, measured by a thermo-mechanical analyzer, in both lengthwise and width directions at 200° C. is equal to or smaller than 20%.

20 Claims, No Drawings

FILM FOR COATING METAL SHEET AND RESIN COATED METAL SHEET

CROSS REFERENCE TO RELATED APPLICATIONS

This is the U.S. National Phase application of PCT/JP2019/041355, filed Oct. 21, 2019, which claims priority to Japanese Patent Application No. 2018-204808 filed Oct. 31, 2018, the disclosures of each of these applications being incorporated herein by reference in their entireties for all purposes.

FIELD OF THE INVENTION

The present invention relates to a film for coating a metal sheet and a resin coated metal sheet.

BACKGROUND OF THE INVENTION

Inner and outer surfaces of metal containers made of tin-free steel (hereinafter described as TFS), aluminum, or the like have been commonly coated with paint for the purpose of preventing corrosion. For such painting, various thermosetting resins such as epoxy resins and phenolic resins have been used. Methods using the thermosetting resins, however, need a long time for paint to dry, leading to such problems that productivity is lowered, huge energy is consumed, and a large amount of solvents are discharged. To solve such problems, various methods that involve layering of thermoplastic resins on metal sheets to coat the metal sheets have been proposed. One of the methods for layering thermoplastic resins on metal sheets is a method in which a metal sheet after being subjected to various types of surface processing such as plating processing is heated and a thermoplastic resin is laminated on the metal sheet by thermo-compression bonding.

The method has a problem in that a thermoplastic resin film exposed under a high temperature atmosphere is thermally shrunk when the thermoplastic resin film is bonded on the heated metal sheet by thermo-compression. Furthermore, wrinkles occur or bubbles enter between the thermoplastic resin film and the metal sheet due to thermal shrinkage of the thermoplastic resin film in some cases. The thermal shrinkage of the thermoplastic resin causes not only productivity deterioration due to product width reduction but also quality deterioration due to occurrence of defects such as bubbles and wrinkles.

As a method for preventing the thermal shrinkage of the film for coating a metal sheet, in Patent Literature 1, a method that involves a three-layer structure has been proposed, the three-layer structure being composed of a layer that plays a role to achieve heat resistance and uses a resin having a high crystallization temperature, a layer that plays a role to achieve shock resistance and deformation resistance and uses a resin having a high melting point, and a layer that plays a role to achieve adhesion to the metal and uses a resin having a low glass-transition temperature. Patent Literatures 2 to 4 propose a method that regulates a laminating roll diameter and a rubber lining thickness, a method that sprays gas onto a running metal belt near a laminating roll, and a method that prevents bubbles by an improved manufacturing method such as depressurization of a lamination portion.

PATENT LITERATURE

Patent Literature 1: Japanese Patent Application Laid-open No. H7-290666

Patent Literature 2: Japanese Patent Application Laid-open No. H6-8335

Patent Literature 3: Japanese Patent Application Laid-open No. H7-214724

Patent Literature 4: Japanese Patent Application Laid-open No. H7-186353

SUMMARY OF THE INVENTION

The method described in Patent Literature 1 assumes heat resistance in heat treatment during and after can manufacturing, and cannot prevent thermal shrinkage under a high lamination temperature condition, which is aimed at by the present invention. The methods described in Patent Literatures 2 to 4 cannot prevent thermal shrinkage of a film inherently and are ineffective under the high lamination temperature condition, which is aimed at by the present invention.

The invention is made to solve the foregoing problems. The invention aims to provide a film for coating a metal sheet and a resin coated metal sheet that can produce a product that has a wide width and also prevent occurrence of wrinkles and entering of bubbles due to small thermal shrinkage, particularly under high temperature.

To solve the problem and achieve the object, a film for coating a metal sheet according to embodiments of the present invention is the film satisfying that: a ratio ($E_{MD}/E_{TD}$) of a Young's modulus $E_{MD}$ in a lengthwise direction to a Young's modulus $E_{TD}$ in a width direction is 1.1 to 4.0; and a thermal shrinkage rate, measured by a thermo-mechanical analyzer, in both lengthwise and width directions at 200° C. is equal to or smaller than 20%.

Moreover, in the film for coating the metal sheet according to embodiments of the present invention, a sum ($E_{MD}+E_{TD}$) of the Young's modulus $E_{MD}$ in the lengthwise direction and the Young's modulus $E_{TD}$ in the width direction is 3000 MPa to 12000 MPa.

Moreover, in the film for coating the metal sheet according to embodiments of the present invention, a melting peak temperature $T_{m1}$ present on a lowest temperature side is 210° C. to 280° C.

Moreover, in the film for coating the metal sheet according to embodiments of the present invention, a ratio of polyester resin to all components is equal to or larger than 80 mass %.

Moreover, in the film for coating the metal sheet according to embodiments of the present invention, a film thickness is 3.0 μm to 25 μm.

Moreover, in the film for coating the metal sheet according to embodiments of the present invention, the film for coating the metal sheet is used for coating a surface of a container.

Moreover, a resin coated metal sheet according to embodiments of the present invention includes the film for coating the metal sheet according to the present invention, on at least one surface of the resin coated metal sheet.

The film for coating a metal sheet and the resin coated metal sheet according to the invention can produce a product that has a wide width and can also prevent occurrence of wrinkles and entering of air bubbles because of small thermal shrinkage, particularly under high temperature, with the thermo-compression bonding lamination method.

DETAILED DESCRIPTION OF EMBODIMENTS OF THE INVENTION

The following describes a film for coating a metal sheet and a resin coated metal sheet according to the invention.

The film for coating a metal sheet according to embodiments of the invention satisfies that a ratio ($E_{MD}/E_{TD}$) of a Young's modulus $E_{MD}$ in a lengthwise direction to a Young's modulus $E_{TD}$ in a width direction is within a range between 1.1 and 4.0 inclusive. The lengthwise direction means a running direction of the film when the film is formed. For example, when the film is formed in a roll form, the lengthwise direction means a winding direction of the roll. The direction perpendicular to the lengthwise direction corresponds to the width direction. The ratio ($E_{MD}/E_{TD}$) is more preferably within a range between 1.2 and 3.5 inclusive, furthermore preferably within a range between 1.3 and 3.0, and particularly preferably within a range between 1.5 and 2.5 from the viewpoint of preventing width direction thermal shrinkage and entering of bubbles and wrinkles in thermo-compression bonding to the metal sheet.

When the ratio ($E_{MD}/E_{TD}$) is smaller than 1.1, the film is easily shrunk in the width direction under high temperature in the thermo-compression bonding. As a result, the product width is reduced in sometimes. The shrinkage of the film causes bubbles and wrinkles to enter between the film and the metal sheet in sometimes. Particularly, when the ratio ($E_{MD}/E_{TD}$) is 1.0, which means a case where an orientation of the film is isotropic or the film has no orientation. Both cases are not preferable in the viewpoint of the width direction thermal shrinkage and entrance of bubbles and wrinkles during thermo-compression bonding to the metal sheet. Even when the orientation is isotropic, not a few residual stresses in the width direction remain, making it impossible to completely prevent the width direction thermal shrinkage, particularly at high temperature. The non-orientated film has no stiffness. The film softened by heat just before the thermo-compression bonding more likely generates bubbles. When a lot of bubbles and wrinkles enter into the resin coated metal sheet as described above, the bubbles and wrinkles cause defects in deep draw forming of a can body of a two-piece can, for example. The defects cause corrosion resistance deterioration in sometimes.

When the ratio ($E_{MD}/E_{TD}$) is larger than 4.0, the orientation in the lengthwise direction is so strong that the film is easily shrunk in the lengthwise direction under high temperature in the thermo-compression bonding. In some cases, the film is ruptured. The strong orientation in the lengthwise direction causes the stiffness in the width direction to be excessively reduced, causing the occurrence of wrinkles in sometimes. When the film is used for surface coating of containers, uniform containers cannot be formed due to high anisotropy. As a result, the corrosion resistance deteriorates in sometimes. The ratio ($E_{MD}/E_{TD}$) can be set to be within the range described above by a method that uniaxially stretches a non-stretched film in the lengthwise direction and a method that longitudinally stretches a biaxially stretched film again, which are described later.

The film for coating a metal sheet according to embodiments of the invention has a thermal shrinkage rate equal to or smaller than 20% in both lengthwise and width directions at 200° C. measured by a thermo-mechanical analyzer (TMA). The thermal shrinkage rate at 200° C. measured by the TMA is more preferably equal to or smaller than 15%, furthermore preferably equal to or smaller than 13%, and particularly preferably equal to or smaller than 11% in both lengthwise and width directions from the viewpoint of preventing the width direction thermal shrinkage and entering of bubbles and wrinkles in thermo-compression bonding to the metal sheet. When the thermal shrinkage rate at 200° C. in the lengthwise direction is larger than 20%, the film is excessively shrunk in the lengthwise direction under high temperature in the thermo-compression bonding, and wrinkles occur easily. In some cases, the film is ruptured. When the thermal shrinkage rate at 200° C. in the width direction is larger than 20%, the film is easily shrunk in the width direction under high temperature in the thermo-compression bonding. As a result, the product width is reduced in sometimes. The shrinkage of the film causes bubbles and wrinkles to enter between the film and the metal sheet in sometimes. When a lot of bubbles and wrinkles enter into the resin coated metal sheet as described above, the bubbles and wrinkles cause defects in deep draw forming of a can body of a two-piece can, for example. The defects cause corrosion resistance deterioration in sometimes.

The thermal shrinkage rate at 200° C. measured by the TMA is preferably equal to or larger than −20%, that is, a thermal expansion rate (or thermal elongation rate) at 200° C. is preferably equal to or smaller than 20% in both lengthwise and width directions from the viewpoint of wrinkling and film rupture in the thermo-compression bonding. The thermal shrinkage rate at 200° C. measured by the TMA can be achieved within the range in both lengthwise and width directions by applying heat treatment and relaxation after stretching, which are described later.

The film for coating a metal sheet according to the invention preferably satisfies that a sum ($E_{MD}+E_{TD}$) of the Young's modulus $E_{MD}$ in the lengthwise direction and the Young's modulus $E_{TD}$ in the width direction is within a range between 3000 MPa and 12000 MPa inclusive. The sum ($E_{MD}+E_{TD}$) is more preferably within a range between 3200 MPa and 10000 MPa inclusive, furthermore preferably within a range between 3400 MPa and 9000 MPa inclusive, and particularly preferably within a range between 3600 MPa and 8500 MPa inclusive from the viewpoint of making it possible to convey the film without occurrence of wrinkles in the manufacturing of the resin coated metal sheet and workability as containers.

When the sum ($E_{MD}+E_{TD}$) is equal to or larger than 3000 MPa, the film has sufficient stiffness, thereby making it possible for the film to be kept flat and smooth in the conveyance and the thermo-compression bonding. When the sum ($E_{MD}+E_{TD}$) is equal to or smaller than 12000 MPa, excellent workability is achieved for processing as containers. Examples of a method that allows the sum ($E_{MD}+E_{TD}$) to be within the range described above include a method that uses a film containing a polyester resin as a main component, which is described later, and a method that stretches and heat-fixes the film with conditions described later.

The film for coating a metal sheet according to the invention preferably satisfies that a melting peak temperature $T_{m1}$ present on a lowest temperature side is within a range between 210° C. and 280° C. inclusive. The melting peak present on the lowest temperature side described herein indicates the melting peak present on the lowest temperature side out of the melting peak temperatures that are detected when two or more kinds of resins having different malting behaviors are mixed, and are inherent to the resins. When only a single melting peak is detected in a case where the film contains a single resin or in a case where although a plurality of resins are mixed, the melting peak present on the lowest temperature side described herein indicates the single melting peak. When a melting peak on a low temperature side is present as a shoulder of a main peak on a high temperature side in a case where melting peaks overlap, the temperature of the shoulder is the melting peak temperature present on the lowest temperature side.

The melting peak temperature $T_{m1}$ present on the lowest temperature side is more preferably within a range between 215° C. and 260° C. inclusive, furthermore preferably within a range between 218° C. and 260° C. inclusive, and particularly preferably within a range between 220° C. and 260° C. inclusive from the viewpoint of preventing entering of bubbles and wrinkles due to thermal shrinkage and softening of the film under high temperature in the thermo-compression bonding to the metal sheet. When the melting peak temperature $T_{m1}$ present on the lowest temperature side is equal to or larger than 210° C., the thermo-compression bonding can be more easily performed without defects. When the melting peak temperature $T_{m1}$ present on the lowest temperature side is equal to or smaller than 280° C., more satisfactory adhesion can be achieved with the metal sheet.

The film for coating a metal sheet according to the invention preferably contains a polyester resin as a main component. The term "main component" means that a ratio of a specific component to all components is equal to or larger than 80 mass %, more preferably equal to or larger than 85 mass %, furthermore preferably equal to or larger than 90 mass %, and particularly preferably equal to or larger than 95 mass %. The polyester resin is preferably a resin that is obtained by polymerization of monomers containing aromatic dicarboxylic acid or aliphatic dicarboxylic acid and diol as a main constituent component, or a mixture thereof.

Examples of aromatic dicarboxylic acid include terephthalic acid, isophthalic acid, phthalic acid, naphthalene dicarboxylic acid, diphenyl dicarboxylic acid, diphenyl ether dicarboxylic acid, diphenyl sulphone dicarboxylic acid, diphenoxyethane dicarboxylic acid, and 5-sodium sulphoisophthalic acid. Examples of aliphatic dicarboxylic acid include oxalic acid, succinic acid, adipic acid, suberic acid, sebacic acid, dimer acid, maleic acid, fumaric acid, dodecanedioc acid, cyclohexane dicarboxylic acid, and ester derivatives thereof. Only one kind of the acid components may be used, or two or more kinds of the acid components may be used together. Furthermore, oxycarboxylic acid such as p-oxybenzoic acid may be copolymerized, for example.

Example of diol components include ethylene glycol, propane diol, butane diol, pentane diol, hexane diol, neopentyl glycol, cyclohexanedimethanol, diethylene glycol, triethylene glycol, polyalkylene glycol, 2,2-bis (4-hydroxyethoxyphenyl) propane, isosorbide (1,4:3,6-dianhydroglucitol, 1,4:3,6-dianhydro-D-sorbitol), spiroglycol, bisphenol A, and bisphenol S. Out of them, ethylene glycol and butane diol are preferably used. Only one kind of diol components may be used, or two or more kinds of diol components may be used together.

It is preferable for the polyester resin for the film for coating a metal sheet according to the invention to use, among the above mentioned polyesters, polyethylene terephthalate and a copolymer thereof, polyethylene naphthalate and a copolymer thereof, and polybutylene terephthalate and a copolymer thereof from the viewpoint of adhesion with the metal sheet. Mixtures thereof can also be preferably used.

It is preferable for the film for coating a metal sheet according to the invention to be copolymerized with polyfunctional compounds such as trimellitic acid, trimesic acid, and trimethylol propane unless the effects of the invention are not impaired. Furthermore, resin components other than the polyester resin may be added to impart functionalities. Examples of the resin components include linear polyolefins such as polyethylene, polypropylene, poly (4-methylpentene-1), and polyacetal; alicyclic polyolefins such as ring-opened metathesis polymers, addition polymers, and addition copolymers with other olefins of norbornenes; biodegradable polymers such as polylactic acid and polybutyl succinate; polyamides such as nylon 6, nylon 11, nylon 12, and nylon 66; aramids; polymethylmethacrylate; polyvinyl chloride; polyvinylidene chloride; polyvinyl alcohol; polyvinyl butyral; ethylene vinyl acetate copolymer; polyacetal; polyglycolic acid; polystyrene; styrene polymethyl methacrylate copolymer; polycarbonate; polyether sulfone; polyether ether ketone; modified polyphenylene ether; polyphenylene sulfide; polyetherimide; polyimide; polyarylate; tetrafluoroethylene resin; trifluororthylene resin; tri fluorochlorothylene resin; tetrafluoroethylene-hexafluoropropylene copolymer; and polyvinylidene fluoride. These may be copolymers or mixtures.

It is preferable for the resin constituting the film for coating a metal sheet according to the invention to be added with a known antioxidant within a range between 0.0001 mass % and 1.0 mass % inclusive, and more preferably within a range between 0.001 mass % to 1.0 mass % inclusive, from the viewpoint of improving the heat resistance. Kinds of the antioxidants are not limited to specific ones. For example, known antioxidants classified into hindered phenol, hydrazine, and phosphite can be used.

The resin constituting the film for coating a metal sheet according to the invention may be added with other various additives besides the antioxidant in a range that does not impair the effects of the invention. For example, lubricants, crystal nucleating agents, heat stabilizers, antistatic agents, antiblocking agents, fillers, viscosity adjusting agents, and coloring pigments can be used.

It is preferable for the film for coating a metal sheet according to the invention to have a film thickness within a range between 3.0 μm and 25 μm inclusive. The film thickness is more preferably within a range between 4.0 μm and 20 μm inclusive, furthermore preferably within a range between 5.0 μm and 15 μm inclusive, and particularly preferably within a range between 6.0 μm and 10 μm inclusive from the viewpoints of film conveyance property in manufacturing the resin coated metal sheet, preventing entering of wrinkles and bubbles during thermo-compression bonding, and preventing the film from melting.

When the film thickness is equal to or larger than 3.0 μm, more excellent film conveyance property is achieved, thereby making it possible to reliably coat the metal sheet. When the application is used as containers, better corrosion resistance is achieved. When the film thickness is equal to or smaller than 25 μm, entering of bubbles between the film and the metal sheet can be more reliably prevented. When the application is used as containers, an increase in cost of the resin coated metal sheet can be prevented without deterioration of the corrosion resistance.

The film for coating a metal sheet according to the invention can be preferably used with a single layer structure of an identical resin composition, but more preferably has a layered structure composed of two or more layers for the purpose of providing functionality. An exemplary layered structure can be achieved in which a surface layer layered on the metal sheet has a composition achieving high adhesiveness with the metal sheet, the surface layer opposite to the said surface layer has a resin composition with excellent flaw resistance, and an inner layer has a composition imparting the heat resistance and the corrosion resistance, for example. The addition of lubricants to only the surface layer and the addition of pigments to only the inner layer are preferable methods of adding the additives in such a manner not to impair the effects of the invention. The layering direction may be not only the thickness direction described above but also the lengthwise direction or the width direction. The layering direction is, however, preferably the thickness direction from the viewpoint of imparting functionalities to the film for coating a metal sheet. Any layering method can be employed, such as co-extrusion methods using a feed block method and a multi-manifold method, and lamination methods including a method for sticking together with another film and a method for layering a molten resin directly on the film.

The following describes a manufacturing method of the film for coating a metal sheet according to embodiments of the invention. The manufacturing method is, however, not limited to that described below. When manufacturing the film for coating a metal sheet according to the invention, the preferable polyester resin described above is prepared in a pellet form, for example. The pellets are dried in a hot air or vacuum as needed, and thereafter, supplied to an extruder together with various additives. In the extruder, the resin is heated and melted above its melting point, an extrusion amount of the molten resin is equalized by a gear pump, for example, and foreign materials, modified resins, and the like are removed by a filter, for example. When the layered structure is employed, another resin is supplied to another extruder other than that described above, and fed into a layering device via different flow paths. For the layering device, a feed block or a multi-manifold die can be used.

Those resins are formed in a sheet shape by a T die and thereafter, discharged. The molten sheet discharged from the T die is extruded onto a cooling body such as a casting dram, and thereafter cooled and solidified to be obtained as a non-stretched film. At the time, for the purpose of enhancing adhesiveness between the cooling body such as the casting drum and the molten sheet, it is preferable to cause the resin to be rapidly cooled and solidified with close adhesion by an electrostatic force using an electrode having a wire shape, a tape shape, a thread shape, or a knife shape, for example. A method that causes the resin to be rapidly cooled and solidified with close adhesion by blowing air from a slit-shaped, a spot-shaped, or a flat-shaped device, a method that causes the resin to be rapidly cooled and solidified by a nip roll, and a method combining them are also preferable.

The non-stretched film thus obtained is, then, preferably longitudinally stretched to be a uniaxially stretched film. It is also preferable to be longitudinally stretched again after being longitudinally stretched and transversely stretched as biaxial stretching.

First, a manufacturing method of the uniaxially stretched film is described. The obtained non-stretched film is stretched in the longitudinal direction. The term stretching in the longitudinal direction means that the stretching causes the film to have a molecular orientation in the longitudinal direction. The stretching is generally made by a circumferential speed difference between rolls. The stretching in the running direction may be performed by a single stage or multiple stages using a plurality of pairs of rolls. A magnification of stretching, which differs in the kinds of resins, is preferably within a range between 2.0 times and 6.0 times inclusive, more preferably within a range between 2.5 times and 5.5 times inclusive, and furthermore preferably within a range between 3.0 times and 5.0 times inclusive.

When a longitudinal direction stretching magnification is smaller than 2.0 times, orientation spots occur and thickness spots in the lengthwise direction become large in sometimes. When the longitudinal direction stretching magnification is larger than 6.0 times, thermal shrinkage may occur easily due to excessive orientation in the lengthwise direction, and wrinkles may occur easily due to weakened stiffness in the width direction. A longitudinal direction stretching temperature is preferably between a glass transition temperature of the resin constituting the film and the glass transition temperature plus 100° C. inclusive. The longitudinal direction stretching temperature is more preferably within a range between the glass transition temperature plus 10° C. and the glass transition temperature plus 80° C. inclusive, and furthermore preferably within a range between the glass transition temperature plus 30° C. and the glass transition temperature plus 70° C. inclusive. When the longitudinal direction stretching temperature is too low, the film is raptured in stretching or orientation in the lengthwise direction is so strong that thermal shrinkage easily occurs in sometimes. When the longitudinal direction stretching temperature is too high, the non-stretched film is thermally crystallized, thereby causing the film to be ruptured in the stretching or, in contrast, the non-stretched film is excessively softened, thereby causing the film to stick to the roll in sometimes, for example.

The film having been stretched in the longitudinal direction is, thereafter, preferably subjected to heat fixation. The heat fixation is preferably performed while the roll in a longitudinal stretching machine heated at a high temperature is running. A heat fixation temperature is preferably between the longitudinal direction stretching temperature and the melting point minus 50° C. inclusive. The heat fixation temperature is more preferably within a range between the longitudinal direction stretching temperature and the longitudinal direction stretching temperature plus 60° C. inclusive, and equal to or smaller than the melting point minus 50° C., furthermore preferably within a range between the longitudinal direction stretching temperature plus 10° C. and the longitudinal direction stretching temperature plus 50° C. inclusive, and equal to or smaller than the melting point minus 50° C., and particularly preferably within a range between the longitudinal direction stretching temperature plus 20° C. and the longitudinal direction stretching temperature plus 40° C. inclusive, and equal to or smaller than the melting point minus 50° C. The heat fixation is important for reducing residual stress in the uniaxially stretched film. When the heat fixation temperature is too low, a residual stress reduction effect cannot be obtained in sometimes. When the heat fixation temperature is too high, the shrinkage of the film is increased, thereby causing entering of wrinkles into the film under conveyance, and the film is ruptured in some cases.

Furthermore, the heat fixation may be performed while the film is relaxed in the lengthwise direction. A relaxation rate is preferably within a range between 0.5% and 10.0% inclusive, more preferably within a range between 1.0% and 8.0% inclusive, and furthermore preferably within a range between 1.5% and 6.0% inclusive. The relaxation performed together with the heat fixation preferably further reduces the residual stress in the uniaxially stretched film. When the relaxation rate is too low, the residual stress reduction effect cannot be obtained in sometimes. When the relaxation rate is too high, the film is not completely shrunk, thereby causing the film under conveyance to be relaxed in sometimes. The film after the heat fixation is gradually cooled while running on a cooling roll, resulting in the uniaxially stretched film being obtained.

The following describes a manufacturing method of a re-stretched film after being biaxially stretched. As the method for biaxial stretching, a successive biaxial stretching method in which stretching is performed in the lengthwise direction and thereafter in the width direction or stretching is performed in the width direction and thereafter in the lengthwise direction, and a simultaneous biaxial stretching method in which stretching is performed in the lengthwise and width directions simultaneously can be used. When the successive biaxial stretching method is employed, the stretching is preferably performed in the lengthwise direction and thereafter in the width direction from the viewpoint of uniformizing quality and saving facility space. The following describes the successive biaxial stretching method in which the stretching is performed in the lengthwise direction and thereafter in the width direction.

First, the obtained non-stretched film is stretched in the longitudinal direction. The term stretching in the longitudinally stretch direction means that the stretching causes the film to have a molecular orientation in the longitudinal direction. The stretching is generally made by a circumferential speed difference between rolls. The stretching in the running direction may be performed by a single stage or multiple stages using a plurality of pairs of rolls. The magnification of stretching, which differs in the kinds of resins, is preferably within a range between 2.0 times and 6.0 times inclusive, more preferably within a range between 2.5 times and 5.0 times inclusive, and furthermore preferably within a range between 2.8 times and 4.5 times inclusive.

When the longitudinal direction stretching magnification is smaller than 2.0 times, the orientation spots occur and the thickness spots in the lengthwise direction become large in sometimes. When the longitudinal direction stretching magnification is larger than 6.0 times, the subsequent width direction stretching becomes difficult, and the film is ruptured in sometimes. The longitudinal direction stretching temperature is preferably between a glass transition temperature of the resin constituting the film and the glass transition temperature plus 100° C. inclusive. The longitudinal direction stretching temperature is more preferably within a range between the glass transition temperature plus 10° C. and the glass transition temperature plus 80° C. inclusive, and furthermore preferably between the glass transition temperature plus 30° C. and the glass transition temperature plus 70° C. inclusive. When the longitudinal direction stretching temperature is too low, the film is raptured in stretching or orientation in the lengthwise direction is so strong that thermal shrinkage easily occurs in sometimes. When the longitudinal direction stretching temperature is too high, the non-stretched film is thermally crystallized, thereby causing the film to be ruptured in the stretching or, in contrast, the non-stretched film is excessively softened, thereby causing the film to stick to the roll in sometimes, for example.

The film having been uniaxially stretched is gradually cooled once, and then is introduced to a tenter type stretching machine while the film end is gripped. A width direction stretching magnification is preferably within a range between 2.5 times and 10.0 times inclusive, more preferably within a range between 3.0 times and 8.0 times inclusive, and furthermore preferably within a range between 3.5 times and 6.0 times inclusive. When the width direction stretching magnification is smaller than 2.5 times, the orientation spots occur and the thickness spots in the width direction become large in sometimes. When the width direction stretching magnification is larger than 10.0 times, re-stretching after the width direction stretching is difficult, and the film is ruptured in sometimes. The stretching temperature is preferably between the glass transition temperature of the resin constituting the film and the glass transition temperature plus 100° C. inclusive, more preferably within a range between the glass transition temperature plus 30° C. and the glass transition temperature plus 100° C. inclusive. The stretching temperature is furthermore preferably within a range between the glass transition temperature plus 35° C. and the glass transition temperature plus 90° C. inclusive, and particularly preferable within a range between the glass transition temperature plus 40° C. and the glass transition temperature plus 80° C. inclusive.

When the width direction stretching temperature is too low, the film is ruptured in the stretching or the orientation in the width direction is too strong, thereby causing the re-stretching after the width direction stretching to be difficult, and the film is ruptured in sometimes. When the width direction stretching temperature is too high, in contrast, no orientation is made, thereby causing the thickness spots in the width direction to become large in sometimes. The film having been stretched in the width direction is preferably subjected to the heat fixation once. The heat fixation is preferably performed in a tenter heated to a high temperature. The heat fixation temperature is preferably between the width direction stretching temperature and the melting point minus 50° C. inclusive. The heat fixation temperature is more preferably within a range between the width direction stretching temperature and the width direction stretching temperature plus 60° C. inclusive, and equal to or smaller than the melting point minus 50° C., furthermore preferably within a range between the width direction stretching temperature plus 10° C. and the width direction stretching temperature plus 50° C. inclusive, and equal to or smaller than the melting point minus 50° C., and particularly preferably within a range between the width direction stretching temperature plus 20° C. and the width direction stretching temperature plus 40° C. inclusive, and equal to or smaller than the melting point minus 50° C.

Furthermore, the heat fixation may be performed while the film is relaxed in the lengthwise direction and/or the width direction. The relaxation rate is preferably within a range between 0.3% and 5.0% inclusive, more preferably within a range between 0.5% and 4.0% inclusive, and furthermore preferably within a range between 0.8% and 3.0% inclusive. The relaxation performed together with the heat fixation simultaneously preferably further reduces the residual stress in the biaxially stretched film. When the relaxation rate is too low, the residual stress reduction effect cannot be obtained in sometimes. When the relaxation rate is too high, the film is not completely shrunk, thereby causing the film to be relaxed in the tenter in sometimes.

The film after the heat fixation is, then, gradually cooled in the tenter, resulting in the biaxially stretched film being obtained.

The obtained biaxially stretched film may be introduced in the longitudinal stretching machine without any change again. The obtained biaxially stretched film may also be winded around a core as a roll by a winding machine once and thereafter introduced anew to the longitudinal stretching machine. The re-longitudinally stretching is also made by a circumferential speed difference between roles. The stretching in the running direction may be performed by a single stage or multiple stages using a plurality of pairs of rolls. A re-stretching magnification is preferably within a range between 1.2 times and 2.8 times inclusive, more preferably within a range between 1.4 times and 2.6 times inclusive, and furthermore preferably within a range between 1.6 times and 2.4 times inclusive.

When the re-stretching magnification is smaller than 1.2 times, the orientation spots occur and the thickness spots in the lengthwise direction becomes large in sometimes. When the re-stretching magnification is larger than 2.8 times, orientation in the longitudinal direction is so strong that thermal shrinkage easily occurs or the film is raptured in sometimes. The stretching temperature is more preferably within a range between 80° C. and 150° C. inclusive, furthermore preferably within a range between 90° C. and 140° C. inclusive, and particularly preferably within a range between 100° C. and 130° C. inclusive. When the stretching temperature is too low, the film is ruptured in the stretching or the orientation in the lengthwise direction is so strong that thermal shrinkage easily occurs in sometimes. When the stretching temperature is too high, in contrast, no orientation is made, thereby causing the thickness spots in the lengthwise direction to become large in sometimes.

The re-stretched film is preferably subjected to the heat fixation. The heat fixation is preferably performed while the roll in the longitudinal stretching machine heated at a high temperature is running. The heat fixation temperature is preferably between the re-stretching temperature and the melting point minus 50° C. inclusive. The heat fixation temperature is more preferably within a range between the re-stretching temperature and the re-stretching temperature plus 60° C. inclusive, and equal to or smaller than the melting point minus 50° C., and furthermore preferably within a range between the re-stretching temperature plus 10° C. and the re-stretching temperature plus 50° C. inclusive, and equal to or smaller than the melting point minus 50° C., and particularly preferably within a range between the re-stretching temperature plus 20° C. and the re-stretching temperature plus 40° C. inclusive, and equal to or smaller than the melting point minus 50° C. The heat fixation is important for reducing residual stress in the film strongly oriented in the lengthwise direction. When the heat fixation temperature is too low, a residual stress reduction effect cannot be obtained in sometimes. When the heat fixation temperature is too high, the shrinkage of the film is increased, thereby causing entering of wrinkles into the film under conveyance, and the film is ruptured in some cases. When the heat fixation temperature is too high, the film has a high crystallization property, causing deterioration of the workability in being processed as containers. The resin film coated on the metal sheet is shaved, causing deterioration of corrosion resistance in sometimes.

Furthermore, the heat fixation may be performed while the film is relaxed in the lengthwise direction. The relaxation rate is preferably within a range between 0.5% and 10.0% inclusive, more preferably within a range between 1.0% and 8.0% inclusive, and furthermore preferably within a range between 1.5% and 6.0% inclusive. The relaxation performed together with the heat fixation preferably further reduces the residual stress in the film oriented in the lengthwise direction. When the relaxation rate is too low, the residual stress reduction effect cannot be obtained in sometimes. When the relaxation rate is too high, the film is not completely shrunk, thereby causing the film under conveyance to be relaxed in sometimes. The film after the heat fixation is, thereafter, gradually cooled while running on a cooling roll, resulting in the re-oriented film being obtained.

The film for coating a metal sheet according to the invention can prevent entering of wrinkles and bubbles in coating the metal sheet by the thermo-compression bonding lamination method, thereby making it possible to be preferably used for containers having excellent corrosion resistance. The film for coating a metal sheet according to the invention has a few film thermal shrinkage amount under high temperature, thereby making it possible to be preferably used for a resin coated metal sheet by being coated on at least one surface of the metal sheet.

EXAMPLES

The following describes the invention in detail by examples. The characteristics were measured and evaluated by the following methods.

(1) Young's Modulus

The Young's modulus was measured using a precision universal material tester (type 210XL) made by INTESCO Co., Ltd. under a condition at 23° C. Samples were cut into a size of 150 mm in a measurement direction (the lengthwise direction or the width direction) by 10 mm in the direction perpendicular to the measurement direction. The Young's modulus was measured according to the method specified by JIS-K7127 (1999) in such a manner that the sample was stretched with a stretching speed of 300 mm/min from an original length of 50 mm. The measurement was repeated five times for each of the lengthwise and width directions. An average value of five times measurements in the lengthwise direction was defined as the lengthwise direction Young's modulus $E_{MD}$. An average value of five times measurements in the width direction was defined as the width direction Young's modulus $E_{TD}$.

(2) 200° C. Thermal Shrinkage Rate

The thermal shrinkage rate was measured using a thermo-mechanical analyzer (TMA7100C) made by Hitachi High-Tech Science Corporation. Samples were cut into a size of 10 mm in an inter-chuck distance in a measurement direction (the lengthwise direction or the width direction) by 4 mm in the direction perpendicular to the measurement direction. The sample was fixed between chucks. The measurement mode was a pull mode (measurement load was 29.4 mN). Temperature was increased from 30° C. to 250° C. at 5° C./min under a nitrogen atmosphere with flow rate of 100 ml/min. A TMA value (displacement amount) at 200° C. was obtained from the chart obtained by the measurement. The displacement amount in shrinkage had a positive value while the displacement amount in expansion or elongation had a negative value. Where the distance between the chucks before measurement is $L_0$ and the displacement amount at 200° C. is $L_1$, the value calculated by the following formula was defined as the 200° C. thermal shrinkage rate.

Thermal shrinkage rate (%)=$(L_1/L_0)\times 100$ (3) Melting Peak Temperature $T_{m1}$ The melting peak temperature $T_{m1}$ was measured using a differential scanning calorimeter (DSCQ100) made by TA instruments with 5 mg of the film of the invention collected on an aluminum pan as a specimen. The specimen was cooled to −50° C. under a nitrogen gas atmosphere and then heated to 290° C. at 20° C./min. From the chart obtained by the measurement, a melting peak temperature present on the lowest temperature side was obtained. The measurement was repeated three times. The average value of three times measurements was defined as the melting peak temperature $T_{m1}$ present on the lowest temperature side of the film.

(4) Film Thickness

The film thickness was measured by a dial gauge 2110S-10 (with a carbide ball gauge head) made by Mitutoyo Corporation set to a dial gauge stand 7001-10 made by Mitutoyo Corporation. The measurement was repeated 10 times at different measurement points. The average value of ten times measurements was defined as the film thickness.

(5) Making Resin Coated Metal Sheet by Thermo-compression Bonding Lamination

As the metal sheet, a TFS (a metal Cr layer: 120 mg/m² and a Cr oxides layer: 10 mg/m² on a metal Cr basis) using an original plate with a temper degree of T3CA and a thickness of 0.22 mm was used. Using the thermo-compression bonding lamination method (film lamination method), the films for coating a metal sheet manufactured by the following examples and comparative examples were coated on both surfaces of the metal sheets. As the specific lamination conditions, the temperature of the metal sheet just before lamination was 250° C. and the laminating roll temperature was 60° C. As the lamination temperature, the temperature just before the lamination was measured by a radiation thermometer (at the position of 100 mm from a nip position). Thereafter, water cooling was performed after a lapse of one second from the thermo-compression bonding, resulting in the resin coated metal sheets coated with the resin coating layers on both surfaces of the metal sheets being obtained.

(6) Change in Film Width

The width of the film of the resin coated metal sheet obtained by the making described at (5) was checked. A film width change shrinkage rate, which is a ratio of the film width after lamination to the film width before lamination, was calculated. A thermo-compression bonding lamination property was evaluated on the basis of the determination criteria described below.

A (superior): the width direction film shrinkage rate in lamination is smaller than 1.0%

B (good): the width direction film shrinkage rate in lamination is equal to or larger than 1.0% and smaller than 5.0%

C (poor): the width direction film shrinkage rate in lamination is equal to or smaller than 5.0%

(7) Amount of Bubbles Included

The surface of the film of the resin coated metal sheet obtained by the making described at (5) was observed by a microscope, an area ratio of bubbles to a normal coated portion in a field of view of 500 µm by 500 µm was calculated. The thermo-compression bonding lamination property was evaluated on the basis of the determination criteria described below.

A (superior): an air bubble included area ratio is smaller than 1.0%

B (good): the air bubble included area ratio is equal to or larger than 1.0% and smaller than 5.0%

C (poor): the air bubble included area ratio is equal to or larger than 5.0%

(8) Number of Wrinkles Included

In a range of 200 mm by 200 mm on the obtained resin coated metal sheet, an inclusion state of wrinkles was visually observed. The thermo-compression bonding lamination property was evaluated on the basis of the determination criteria described below.

A (superior): no wrinkle is included

B (good): the number of included wrinkle is one

C (poor): the number of included wrinkles is two or more (9) Metal can Corrosion Resistance The resin coated metal sheet obtained by the making at (5) was subjected to DRD (draw & redraw) forming to be made into a two piece can body. The can was filled with 1 weight % salt water up to 80% of the can volume. A negative electrode was soaked in salt water and a positive electrode was set at a position where the metal of a can opening portion was exposed. A voltage of 6.2 V was applied between the electrodes and a current value was measured after four seconds from the application of the voltage. On the basis of the measured current value, metal can corrosion resistance was evaluated according to the following determination criteria.

A (superior): smaller than 0.1 mA

B (good): equal to or larger than 0.1 mA and smaller than 5 mA

C (poor): equal to or larger than 5 mA

Example 1

As a raw material resin of the film, pellets of polybutylene terephthalate (hereinafter, described as PBT) having a melting point of 224° C. and polyethylene terephthalate (hereinafter, described as PET) having a melting point of 258° C. were prepared. They were sufficiently dried under high temperature in vacuum such that they contain no moisture. Thereafter, the pellets were blended such that the composition is 60 mass % PBT and 40 mass % PET as a resin composition A for a layer (layer A) that adheres to the metal sheet in the later thermo-compression bonding with the metal sheet. Furthermore, the pellets were blended such that the composition is 80 mass % PBT and 20 mass % PET as a resin composition B for a layer (layer B) that does not adhere to the metal sheet in the later thermo-compression bonding with the metal sheet, that is, for a layer on the front layer side. The resin compositions A and B were put into two different single screw extruders separately to be subjected to melting and kneading at 270° C. Then, foreign materials were removed via a sintered filter having a filter rating of 25 µm. Thereafter, they were combined by a feed block designed such that a layer ratio of the layers A and B is 2:8, resulting in two layers being layered in the thickness direction. The layered molten resins were discharged from the T die. The discharged resins were cooled and solidified on a casting drum controlled such that the surface temperature is 30° C., resulting in a non-stretched film having a thickness of 18 µm being obtained. Then, preheating was performed using a heated ceramic roll such that the film temperature is 100° C., and the film was subjected to stretching with a magnification of 3.0 times in the lengthwise direction of the film. Thereafter, the heat fixation was performed at 120° C. using heated mirror surface HCr plated rolls. In the heat fixation, relaxation of 3.0% in the lengthwise direction was performed using a speed difference between two continuous mirror surface HCr plated rolls. At the end, the film was gradually cooled to a room temperature. The film end portion of which had been removed was winded by a winding machine, resulting in a film for coating a metal sheet having a thickness of 6.0 µm being obtained. The physical properties of the obtained film are illustrated in Table 1.

Example 2

The making was performed in the same manner as Example 1 except that the thickness of the non-stretched film was 12 µm and the stretching magnification in the lengthwise direction was 2.0 times, resulting in the film for coating a metal sheet having a thickness of 6.0 µm being obtained. The physical properties of the obtained film are illustrated in Table 1.

Example 3

As a raw resin material of the film, pellet of PET having a melting temperature of 258° C. were prepared. The pellets were sufficiently dried under high temperature in vacuum such that the pellets contain no moisture. The pellets were put into a single screw extruder to be subjected to melting and kneading at 280° C. Then, foreign materials were removed via a sintered filter having a filter rating of 25 µm. Thereafter, the molten resin was discharged from the T die. The discharged resin was cooled and solidified on a casting drum controlled such that the surface temperature is 35° C., resulting in a non-stretched film having a thickness of 150 µm being obtained. Then, preheating was performed using a heated ceramic roll such that the film temperature is 110° C., and the film was subjected to stretching with a magnification of 3.5 times in the lengthwise direction of the film. Thereafter, the film was introduced to a tenter type stretching machine while the film end was gripped to be stretched 4.0 times in the width direction at 120° C. The relaxation of 1.5% was performed in the width direction while the heat fixation was performed at 140° C. without any change. Thereafter, the film was gradually cooled to a room temperature, and the film the end portion of which had been removed was introduced to a longitudinal stretching machine. Preheating was performed using a ceramic roll such that the film temperature was 120° C., and the film was re-stretched 2.0 times in the lengthwise direction of the film. Thereafter, the heat fixation was performed at 140° C. using heated mirror surface HCr plated rolls. In the heat fixation, relaxation of 3.0% in the lengthwise direction was performed using a speed difference between two continuous mirror surface HCr plated rolls. At the end, the film was gradually cooled to a room temperature. The film end portion of which had been removed was winded by a winding machine, resulting in a film for coating a metal sheet having a thickness of 6.0 µm being obtained. The physical properties of the obtained film are illustrated in Table 1.

Example 4

The making was performed in the same manner as Example 3 except that the thickness of the non-stretched film was 190 µm and the re-stretching magnification in the lengthwise direction was 2.8 times, resulting in the film for coating a metal sheet having a thickness of 6.0 µm being obtained. The physical properties of the obtained film are illustrated in Table 1.

Example 5

The making was performed in the same manner as Example 1 except that the thickness of the non-stretched film was 11.4 µm and the stretching magnification in the lengthwise direction was 1.9 times, resulting in the film for coating a metal sheet having a thickness of 6.0 µm being obtained. The physical properties of the obtained film are illustrated in Table 1.

Example 6

The making was performed in the same manner as Example 4 except that the heat fixation temperature after re-stretching in the lengthwise direction was 160° C., resulting in the film for coating a metal sheet having a thickness of 6.0 µm being obtained. The physical properties of the obtained film are illustrated in Table 1.

Example 7

As a raw material of the film, pellets of PET having a melting point of 258° C. and isophthalic acid copolymerized PET (hereinafter described as CoPET) having a melting point of 208° C. were prepared. The making was performed in the same manner as Example 1 except that the layering was performed such that PET was on the layer A side while CoPET was on the layer B side and the stretching temperature in the lengthwise direction was 95° C., resulting in the film for coating a metal sheet having a thickness of 6.0 µm being obtained. The physical properties of the obtained film are illustrated in Table 1.

Example 8

The making was performed in the same manner as Example 1 except that the thickness of the non-stretched film was 15 µm, resulting in the film for coating a metal sheet having a thickness of 5.0 µm being obtained. The physical properties of the obtained film are illustrated in Table 1.

Example 9

The making was performed in the same manner as Example 1 except that the thickness of the non-stretched film was 8.5 µm, resulting in the film for coating a metal sheet having a thickness of 2.8 µm being obtained. The physical properties of the obtained film are illustrated in Table 1.

Example 10

The making was performed in the same manner as Example 1 except that the thickness of the non-stretched film was 45 µm, resulting in the film for coating a metal sheet having a thickness of 15 µm being obtained. The physical properties of the obtained film are illustrated in Table 1.

Example 11

The making was performed in the same manner as Example 1 except that the thickness of the non-stretched film was 80 µm, resulting in the film for coating a metal sheet having a thickness of 26 µm being obtained. The physical properties of the obtained film are illustrated in Table 1.

Example 12

The making was performed in the same manner as Example 1 except that the thickness of the non-stretched film was 15 µm and the stretching magnification in the lengthwise direction was 2.5 times, resulting in the film for coating a metal sheet having a thickness of 6.0 µm being obtained. The physical properties of the obtained film are illustrated in Table 1.

Example 13

The making was performed in the same manner as Example 1 except that the thickness of the non-stretched film was 24 µm and the stretching magnification in the lengthwise direction was 4.0 times, resulting in the film for coating a metal sheet having a thickness of 6.0 µm being obtained. The physical properties of the obtained film are illustrated in Table 1.

Example 14

The making was performed in the same manner as Example 3 except that the relaxation rate after re-stretching in the lengthwise direction was 0.5%, resulting in the film for coating a metal sheet having a thickness of 6.0 μm being obtained. The physical properties of the obtained film are illustrated in Table 1.

Example 15

The making was performed in the same manner as Example 3 except that the thickness of the non-stretched film was 120 μm and the re-stretching magnification in the lengthwise direction was 1.2 times, resulting in the film for coating a metal sheet having a thickness of 6.0 μm being obtained. The physical properties of the obtained film are illustrated in Table 1.

Comparative Example 1

The non-stretched film was obtained in the same manner as Example 1 except that the resin discharge amount from the T die was adjusted. The non-stretched film the end portion of which had been removed was winded by a winding machine, resulting in the film for coating a metal sheet having a thickness of 6.0 μm being obtained. The physical properties of the obtained film are illustrated in Table 1.

Comparative Example 2

The biaxial stretching was performed in the same manner as the third example except that the resin discharge amount from the T die was adjusted. The film the end portion of which had been removed after the transversal stretching was winded by a winding machine, resulting in the film for coating a metal sheet having a thickness of 6.0 μm being obtained. The physical properties of the obtained film are illustrated in Table 1.

Comparative Example 3

The making was performed in the same manner as the third example except that the heat fixation and the relaxation were not performed after re-stretching in the lengthwise direction, resulting in the film for coating a metal sheet having a thickness of 6.0 μm being obtained. The physical properties of the obtained film are illustrated in Table 1.

Comparative Example 4

The making was performed in the same manner as Example 1 except that the relaxation was not performed after stretching in the lengthwise direction, resulting in the film for coating a metal sheet having a thickness of 6.0 μm being obtained. The physical properties of the obtained film are illustrated in Table 1.

Evaluation

The evaluation results of the thermo-compression bonding lamination property on Example 1 to Example 15 and Comparative Example 1 to Comparative Example 4 are illustrated in Table 1. As illustrated in Table 1, in Comparative Example 1 to Comparative Example 4, at least one of the change in film width, the air bubble inclusion, and the wrinkle inclusion was evaluated to be C (poor). In contrast, in the Example 1 to Example 15, the change in film width, the air bubble inclusion, and the wrinkle inclusion were all evaluated to be equal to or above B (good). On the basis of the evaluation results, it was confirmed that, according to the invention, a product having a wide width can be manufactured, and occurrence of wrinkles and entering of bubbles can be suppressed due to the small thermal shrinkage, particularly under high temperature, when the metal sheet is coated by the thermo-compression bonding lamination method.

TABLE 1

| | | | Example 1 | Example 2 | Example 3 | Example 4 | Example 5 | Example 6 | Example 7 | Example 8 | Example 9 | Example 10 |
|---|---|---|---|---|---|---|---|---|---|---|---|---|
| Young's modulus | $E_{MD}$ | MPa | 2,220 | 1,600 | 5,840 | 7,970 | 1,500 | 8,500 | 2,180 | 2,530 | 3,000 | 2,180 |
| | $E_{TD}$ | MPa | 1,470 | 1,400 | 2,380 | 2,120 | 1,400 | 3,600 | 1,480 | 1,520 | 1,800 | 1,420 |
| | $E_{MD}/E_{TD}$ | — | 1.5 | 1.1 | 2.5 | 3.8 | 1.1 | 2.4 | 1.5 | 1.7 | 1.7 | 1.5 |
| | $E_{MD} + E_{TD}$ | MPa | 3,690 | 3,000 | 8,220 | 10,100 | 2,900 | 12,100 | 3,660 | 4,050 | 4,800 | 3,600 |
| 200° C. Thermal compression rate | Lengthwise direction | % | 11 | 6.7 | 11 | 20 | 5.9 | 15 | 11 | 10 | 9.2 | 11 |
| | Width direction | % | −3.0 | −5.6 | 10 | 18 | −5.0 | 12 | −0.5 | −4.2 | −5.2 | −1.5 |
| Melting peak temperature | $T_{m1}$ | ° C. | 220 | 220 | 255 | 255 | 220 | 255 | 208 | 220 | 220 | 220 |
| Resin Composition | Layer A (metal sheet side) | | PET-PBT | PET-PBT | PET | PET | PET-PBT | PET | PET | PET-PBT | PET-PBT | PET-PBT |
| | Layer B (front layer side) | | PET-PBT | PET-PBT | — | — | PET-PBT | — | CoPET | PET-PBT | PET-PBT | PET-PBT |
| | Layer ratio (layer A:layer B) | | 2:8 | 2:8 | — | — | 2:8 | 2:8 | 2:8 | 2:8 | 2:8 | 2:8 |
| | Film thickness | μm | 6.0 | 6.0 | 6.0 | 6.0 | 6.0 | 6.0 | 6.0 | 5.0 | 2.8 | 15 |
| Thermo-compression bonding lamination property | Change in film width | | A | B | A | B | A | A | B | A | A | A |
| | Air bubble inclusion | | A | B | A | B | B | A | B | A | A | A |
| | Wrinkle | | A | B | A | B | B | B | B | A | B | A |
| | Metal can corrosion resistance | | A | A | A | B | A | B | A | B | B | A |

TABLE 1-continued

|  |  |  | Example 11 | Example 12 | Example 13 | Example 14 | Example 15 | Comparative Example 1 | Comparative Example 2 | Comparative Example 3 | Comparative Example 4 |
|---|---|---|---|---|---|---|---|---|---|---|---|
| Young's modulus | $E_{MD}$ | MPa | 2,070 | 1,950 | 3,530 | 6,300 | 3,980 | 1,380 | 3,390 | 6,500 | 2,620 |
|  | $E_{TD}$ | MPa | 1,380 | 1,450 | 1,180 | 2,200 | 3,200 | 1,340 | 3,600 | 2,270 | 1,450 |
|  | $E_{MD}/E_{TD}$ | — | 1.5 | 1.3 | 3.0 | 2.9 | 1.2 | 1.0 | 0.94 | 2.9 | 1.8 |
|  | $E_{MD}+E_{TD}$ | MPa | 3,450 | 3,400 | 4,710 | 8,500 | 7,180 | 2,720 | 6,990 | 8,770 | 4,070 |
| 200° C. Thermal compression rate | Lengthwise direction | % | 10 | 9.0 | 13 | 13 | 9.0 | −10 | 21 | 36 | 21 |
|  | Width direction | % | −0.8 | −3.5 | −6.0 | 9.6 | 13 | −13 | 12 | 23 | −3.3 |
| Melting peak temperature | $T_{m1}$ | °C. | 220 | 220 | 220 | 255 | 255 | 220 | 254 | 255 | 220 |
| Resin Composition | Layer A (metal sheet side) |  | PET-PBT | PET-PBT | PET-PBT | PET | PET | PET-PBT | PET | PET | PET-PBT |
|  | Layer B (front layer side) |  | PET-PBT | PET-PBT | PET-PBT | — | — | PET-PBT | — | — | PET-PBT |
|  | Layer ratio (layer A:layer B) |  | 2:8 | 2:8 | 2:8 | — | — | 2:8 | — | — | 2:8 |
|  | Film thickness | μm | 26 | 6.0 | 6.0 | 6.0 | 6.0 | 6.0 | 6.0 | 6.0 | 6.0 |
| Thermo-compression bonding lamination property | Change in film width |  | A | A | A | A | A | B | B | C | A |
|  | Air bubble inclusion |  | B | A | A | A | A | C | B | C | A |
|  | Wrinkle |  | A | A | A | A | A | A | C | C | C |
|  | Metal can corrosion resistance |  | A | A | A | A | A | C | C | C | C |

INDUSTRIAL APPLICABILITY

The invention can provide a film for coating a metal sheet and a resin coated metal sheet that can produce a product that has a wide width and also suppresses occurrence of wrinkles and entering of bubbles due to small thermal shrinkage, particularly under high temperature, in the thermo-compression bonding lamination method.

The invention claimed is:

1. A film for coating a metal sheet, the film satisfying that:
   a ratio ($E_{MD}/E_{TD}$) of a Young's modulus $E_{MD}$ in a lengthwise direction to a Young's modulus $E_{TD}$ in a width direction is 1.1 to 4.0; and
   a thermal shrinkage rate, measured by a thermo-mechanical analyzer, in both lengthwise and width directions at 200° C. is equal to or smaller than 20% and equal to or larger than 0.8%,
   wherein a sum ($E_{MD}+E_{TD}$) of the Young's modulus $E_{MD}$ in the lengthwise direction and the Young's modulus $E_{TD}$ in the width direction is 3000 MPa to 8500 MPa.

2. The film for coating the metal sheet according to claim 1, wherein the sum ($E_{MD}+E_{TD}$) of the Young's modulus $E_{MD}$ in the lengthwise direction and the Young's modulus $E_{TD}$ in the width direction is 3200 MPa to 8500 MPa.

3. The film for coating the metal sheet according to claim 1, wherein a melting peak temperature $T_{m1}$ present on a lowest temperature side is 210° C. to 280° C.

4. The film for coating the metal sheet according to claim 2, wherein a melting peak temperature $T_{m1}$ present on a lowest temperature side is 210° C. to 280° C.

5. The film for coating the metal sheet according to claim 1, wherein a ratio of polyester resin to all components is equal to or larger than 80 mass %.

6. The film for coating the metal sheet according to claim 2, wherein a ratio of polyester resin to all components is equal to or larger than 80 mass %.

7. The film for coating the metal sheet according to claim 3, wherein a ratio of polyester resin to all components is equal to or larger than 80 mass %.

8. The film for coating the metal sheet according to claim 4, wherein a ratio of polyester resin to all components is equal to or larger than 80 mass %.

9. The film for coating the metal sheet according to claim 1, wherein a film thickness is 3.0 μm to 25 μm.

10. The film for coating the metal sheet according to claim 2, wherein a film thickness is 3.0 μm to 25 μm.

11. The film for coating the metal sheet according to claim 3, wherein a film thickness is 3.0 μm to 25 μm.

12. The film for coating the metal sheet according to claim 4, wherein a film thickness is 3.0 μm to 25 μm.

13. The film for coating the metal sheet according to claim 1, wherein the film for coating the metal sheet is used for coating a surface of a container.

14. The film for coating the metal sheet according to claim 2, wherein the film for coating the metal sheet is used for coating a surface of a container.

15. The film for coating the metal sheet according to claim 3, wherein the film for coating the metal sheet is used for coating a surface of a container.

16. The film for coating the metal sheet according to claim 4, wherein the film for coating the metal sheet is used for coating a surface of a container.

17. A resin coated metal sheet, comprising a film on at least one surface of the resin coated metal sheet, the film satisfying that:
   a ratio ($E_{MD}/E_{TD}$) of a Young's modulus $E_{MD}$ in a lengthwise direction to a Young's modulus $E_{TD}$ in a width direction is 1.1 to 4.0; and
   a thermal shrinkage rate, measured by a thermo-mechanical analyzer, in both lengthwise and width directions at 200° C. is equal to or smaller than 20% and equal to or larger than 0.8%, wherein a sum ($E_{MD}+E_{TD}$) of the Young's modulus $E_{MD}$ in the lengthwise direction and the Young's modulus $E_{TD}$ in the width direction is 3000 MPa to 8500 MPa.

18. The resin coated metal sheet according to claim 17, wherein the sum ($E_{MD}+E_{TD}$) of the Young's modulus $E_{MD}$ in the lengthwise direction and the Young's modulus $E_{TD}$ in the width direction, of the film, is 3200 MPa to 8500 MPa.

19. The resin coated metal sheet according to claim 17, wherein a melting peak temperature $T_{m1}$ present on a lowest temperature side, of the film, is 210° C. to 280° C.

20. The resin coated metal sheet according to claim 18, wherein a melting peak temperature $T_{m1}$ present on a lowest temperature side, of the film, is 210° C. to 280° C.

* * * * *

UNITED STATES PATENT AND TRADEMARK OFFICE
CERTIFICATE OF CORRECTION

| | | |
|---|---|---|
| PATENT NO. | : 12,280,575 B2 | Page 1 of 1 |
| APPLICATION NO. | : 17/286596 | |
| DATED | : April 22, 2025 | |
| INVENTOR(S) | : Soichi Fujimoto, Yasuhide Oshima and Katsumi Kojima | |

It is certified that error appears in the above-identified patent and that said Letters Patent is hereby corrected as shown below:

On the Title Page

Item (56) under U.S. PATENT DOCUMENTS, "2013/0172615 A1" should read --2013/0172515 A1--.

Signed and Sealed this
Tenth Day of June, 2025

Coke Morgan Stewart
*Acting Director of the United States Patent and Trademark Office*